Figure 1:
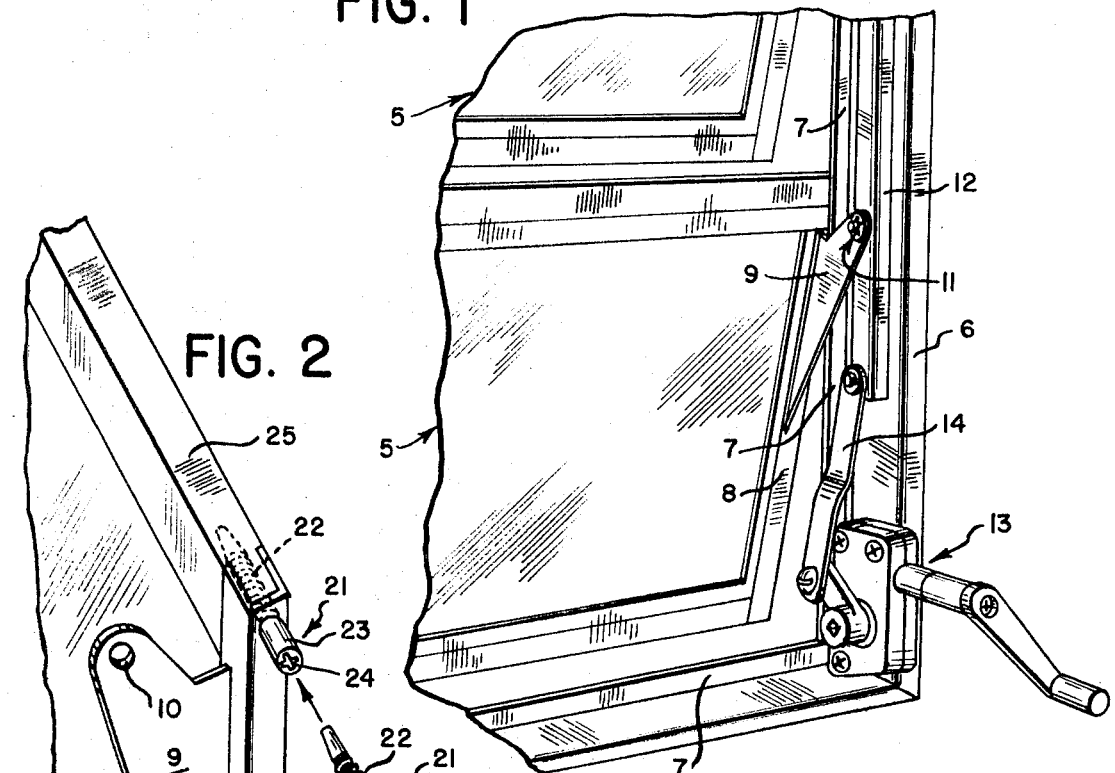

United States Patent [19]
Johnson

[11] 3,750,336  
[45] Aug. 7, 1973

[54] AWNING WINDOW ASSEMBLY

[75] Inventor: Philip C. Johnson, South Bend, Ind.

[73] Assignee: Wells Aluminum Corporation, North Liberty, Ind.

[22] Filed: Dec. 29, 1971

[21] Appl. No.: 213,550

[52] U.S. Cl. .................................. 49/371, 49/403
[51] Int. Cl. ............................................ E06b 3/40
[58] Field of Search .................... 49/85, 82, 84, 86, 49/87, 88, 83, 403, 371; 16/168, 169

[56] References Cited
UNITED STATES PATENTS

| | | | |
|---|---|---|---|
| 3,381,601 | 5/1968 | McCabe | 49/90 X |
| 3,536,120 | 10/1970 | Kellems | 160/206 |
| 3,191,241 | 6/1965 | Johnson | 49/403 |
| 3,592,257 | 7/1971 | Matyas | 160/206 |
| 2,820,260 | 1/1958 | Tucker | 49/403 |
| 863,573 | 8/1907 | McCord | 49/74 |
| 2,490,438 | 12/1949 | Huff | 49/403 |
| 2,584,111 | 2/1952 | Brenner et al. | 16/169 UX |
| 2,694,235 | 11/1954 | Jansen | 49/388 X |
| 2,830,335 | 4/1958 | Miller | 49/74 X |
| 3,040,850 | 6/1962 | Steel | 49/403 X |
| 3,116,057 | 12/1963 | Fink | 49/83 X |
| 3,524,281 | 8/1970 | Streeter | 49/74 |

Primary Examiner—Dennis L. Taylor  
Attorney—Dean S. Edmonds, Merton S. Neill et al.

[57] ABSTRACT

An awning window assembly features a weather-tight window vent pivot support for the side member of the window frame and a pivot mount for connecting the tilting bracket to the tilt bar after the window vent and the tilt bar have been installed in the window assembly.

3 Claims, 3 Drawing Figures

PATENTED AUG 7 1973 3,750,336

AWNING WINDOW ASSEMBLY

This invention relates to awning windows and, more particularly, to improvements in the pivoting and tilting components of awning window assemblies.

Awning window assemblies generally comprise a frame, composed of side, top and bottom members, within which a plurality of window vents are mounted, one above the other, for pivoting movement about a horizontal axis aligned with the top of each window vent. This pivoting is achieved by a horizontal pivot member projecting from each side of a window vent and extending into the proximal frame side member. It is common practice to provide the pivot member as a part of a bracket secured to the side edge of the window vent and to provide the support for this pivot in the frame side member by a pivot support socket bracket which is secured to the frame side member by screws or rivets. These securing screws or rivets, being exposed to the outside atmosphere between the side edge of the window vent and the window frame side member, are a source of leakage of moisture through the side frame member and into the surrounding building structure.

The window vents are tilted about their pivot members by a tilting bracket extending inwardly from the plane of the window vent and pivotally secured to a tilt bar arranged to be moved vertically along an adjacent window frame side member. In the past, it has generally been necessary to connect the tilting bracket to the tilt bar by a riveted pivot or the like prior to installation of the window vents, and this has aggravated mounting of the tilt bar and has complicated the overall problem of assembling the window structure.

I have now devised an awning window assembly featuring a weather-tight window vent pivot support for the window frame side member and a mounting pivot for connecting the tilting bracket to the tilt bar after the window vents have been installed in the window frame structure. The improved pivot support member of the invention is in the form of a closed-bottom open-top bushing provided with a collar portion adjacent the open end of the bushing, the closed-bottom end of each support member bushing being adapted to be inserted through an opening in a respective window frame side member with its collar portion positioned against the surface of the frame side member, the open-end of the bushing facing the adjacent side of the window vent and being adapted to receive a pivot member extending outwardly from the side of the window vent. The improved mounting pivot for connecting the tilting bracket to the tilt bar is in the form of a rod hollowed at one end to provide a rivet body portion and provided with a collar portion adjacent the boundary between the rivet body portion and the remaining pivot body portion of the rod.

Figure 2:
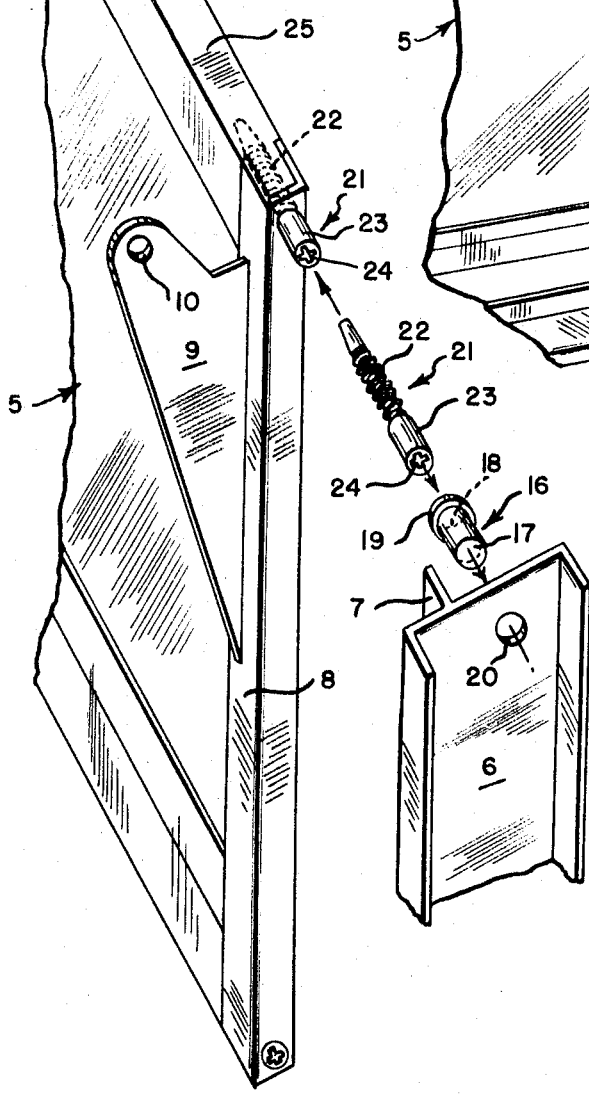
Figure 3:
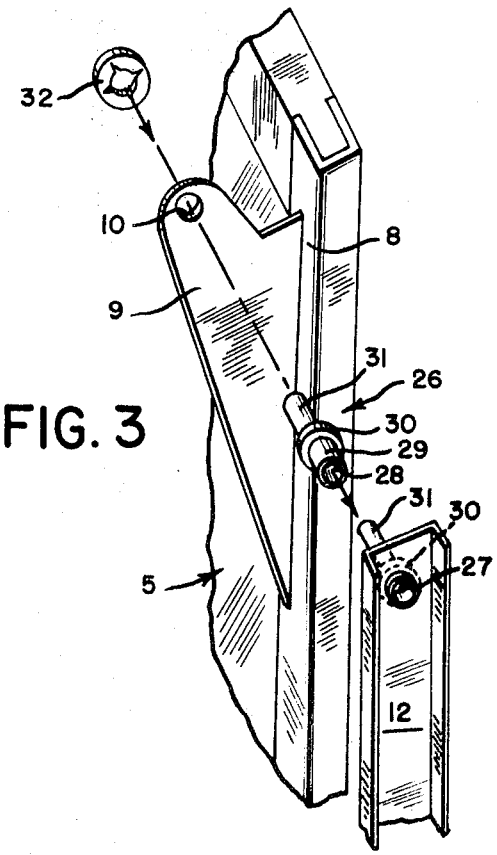

These and other novel features of the awning window assembly of the invention will be more fully understood from the following description taken in conjunction with the accompanying drawing in which FIG. 1 is a partial prespective view of an awning window assembly embodying the invention;

FIG. 2 is an exploded perspective view, partly broken away, of the pivot support of the invention and its assembly with a window vent and a window frame side member; and FIG. 3 is an exploded perspective view of the tilting mechanism mounting pivot of the invention and its assembly with a window vent tilting bracket and tilt bar.

The awning window assembly shown in FIG. 1 is of the type comprising a plurality of window vents 5 pivotally mounted at each top edge in the proximal side member 6 of a window frame assembly and adapted, when closed, to bear against the interior surface of a stop bar 7 forming a part of each side, top and bottom member of the window frame. The inner face of one side frame 8 of each window vent is provided with an inwardly projecting tilting bracket 9. The inner extremity of the tilting bracket is provided with a hole 10 in which a pivot mount 11 is positioned so as to connect the tilting bracket to a tilt bar 12 mounted for vertical movement along the window frame side member 6. A conventional crank and gear box assembly 13 operates a connecting bar 14 so as to move the tilt bar 12 vertically. The resulting vertical movement of this tilt bar 12, through its interconnection to the tilting bracket 9, causes the window vent to pivot and thus tilt the vent toward either its open or closed position.

The pivot mounting of the window vent is shown in exploded detail in FIG. 2. Pursuant to the invention, the pivot support member comprises a bushing 16 having a closed bottom 17 at one end and having an opposite open end 18. The bushing is provided with a collar 19 adjacent its open end so as to form a stop when the closed bottom end 17 of the bushing is inserted in a hole in the face of the window side frame member 6. The inside diameter of the hole 20 is substantially the same as the outside diameter of the bushing 16 so as to permit a forced-fit of the bushing in the hole. By making the bushing of suitable plastic such as nylon or the like, it provides a freely sliding interior socket surface for a window vent pivot 21.

The window vent pivot can be of any conventional type, but pursuant to the novel assembly structure of the invention it is preferred to use as the pivot a self-tapping type screw 22 provided with a cylindrical head portion 23. The head portion 23 forms the desired pivot 21 and is advantageously provided in its face with a suitable recessed slot 24 for a screw driver. Thus, the self-tapping pivot-screw can be used as shown in FIG. 2 to secure the top end of the window vent side frame 8 to the abutting end of the top frame member 25 of the window vent. The outside diameter of the cylindrical head portion 23 of the pivot-screw is such as to fit freely within the open end 18 of the pivot support member.

The tilting bracket 9 may be secured to the window vent side frame 8 in any conventional manner, although I presently prefer to form it integral with the side frame in the form of a single extrusion of frame member material such as aluminum. The tilting bracket is pivotally connected to the tilt bar 12 by a mounting pivot 26, shown in the exploded view of FIG. 3, which extends through the hole 10 in the tilting bracket 9 and a hole 27 in the face of the tilt bar 12. The mounting pivot 26 is formed of a rod hollowed at one end 28 to provide a rivet body portion 29. In addition, the rod is provided with a collar portion 30 adjacent the boundary between the rivet body portion and the remaining rod-like body portion 31. The rivet body portion is inserted up to the collar portion 30 through the hole 27 in the tilt bar 12 and is peened over to form a tight rivet joint. The rod-like body portion 31 of the mounting pivot is ready to be inserted through the hole 10 in the tilting bracket 9 and to be held in place by a conventional press-on nut 32.

It will be seen, accordingly, that the awning window assembly of the invention is characterized by a window vent pivot support member which is completely weather proof and by a tilting bracket pivot mount that permits interconnection of the tilting bracket to the tilt bar after the window vents have been assembled within their supporting frame.

I claim:

1. In an awning window assembly wherein each of a plurality of window vents is mounted for horizontal pivoting about a pivot support member disposed in each of adjacent frame side members of the assembly, the improvement which comprises a weather-proof pivot support member in the form of a closed-bottom open-top bushing provided with a collar portion adjacent the open end of the bushing, the closed-bottom end of each support member bushing being inserted through an opening in each of the respective frame side members with the collar portion of each bushing positioned against the surface of the respective frame side member, the open-end of the bushing facing the adjacent side of the window vent and being adapted to receive a pivot member extending outwardly from the proximal side of the window vent.

2. An awning window assembly according to claim 1 in which the pivot member comprises a cylindrical head portion of a self-tapping screw mounted in the top end of the side wall of the window and securing this side wall to a top frame member of the window.

3. In an awning window assembly wherein each of a plurality of window vents is mounted for horizontal pivoting about an axis support member disposed in each of adjacent frame side members, wherein each window vent is provided with a tilting bracket projecting inwardly perpendicular to the plane of the window vent, and wherein each tilting bracket is connected by a mounting pivot to a tilt bar positioned for vertical movement along an adjacent frame side member of the assembly whereby vertical movement of the tilt bar effects pivotal tilting of the window vent about its axis support member, the improvement which comprises providing the mounting pivot in the form of a rod hollowed at one end to provide a rivet body portion and provided with a collar portion adjacent the boundary between the rivet body portion and the remaining pivot body portion of the rod, the mounting pivot being positioned with its collar portion against one surface of the tilt bar and its hollow end being peened over against the opposite surface of the tilt bar.

* * * * *